(12) United States Patent
Kim et al.

(10) Patent No.: US 8,316,246 B2
(45) Date of Patent: Nov. 20, 2012

(54) NETWORK SYSTEM, NETWORK MONITOR AND METHOD FOR RESETTING NETWORK MONITOR

(75) Inventors: Hyun-Seok Kim, Gyeonggi-do (KR); Sang-Heon Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 398 days.

(21) Appl. No.: 12/760,296

(22) Filed: Apr. 14, 2010

(65) Prior Publication Data

US 2010/0275043 A1 Oct. 28, 2010

(30) Foreign Application Priority Data

Apr. 22, 2009 (KR) .................. 10-2009-0035091

(51) Int. Cl.
*G06F 1/00* (2006.01)
*G06F 11/00* (2006.01)

(52) U.S. Cl. ............... 713/300; 714/100; 714/2; 714/23

(58) Field of Classification Search ................ 713/300; 714/100, 2, 23
See application file for complete search history.

(56) References Cited

U.S. PATENT DOCUMENTS

| 8,213,979 B1 * | 7/2012 | Shetty et al. ................ 455/522 |
| 2004/0152439 A1 * | 8/2004 | Kimura et al. ............... 455/403 |
| 2007/0030816 A1 * | 2/2007 | Kolavennu .................. 370/252 |
| 2010/0215360 A1 * | 8/2010 | Weng et al. .................. 398/23 |

FOREIGN PATENT DOCUMENTS

| KR | 2006012814 A | 2/2006 |
| KR | 2008058904 A | 6/2008 |

OTHER PUBLICATIONS

Korean Office Action dated Oct. 28, 2010 for Application No. 2009-0035091, with English translation, 10 pages.

* cited by examiner

*Primary Examiner* — Mark Connolly
(74) *Attorney, Agent, or Firm* — Fish & Richardson P.C.

(57) ABSTRACT

A network system includes a server computer connected to at least one client device and configured to perform at least one operation corresponding to an operation signal received from the at least one client device, and transmitting result data based on the performed operation to a corresponding client device and the at least one client device configured to transmit the operation signal in response to an input from a user, receive the result data transmitted from the server computer and processing the result data, wherein the at least one of the client devices configured to determine whether the result data from the server computer is normal and perform power halting operation for a predetermined time period based on a determination that the result data is abnormal.

20 Claims, 9 Drawing Sheets

Figure 7

|  | ACCOUNT | PASSWORD |
|---|---|---|
| FIRST CLIENT | A123 | aabb |
|  | B456 | zz123 |
| SECOND CLIENT | Q0000 | 12sss |
| THIRD CLIENT | B123 | ccff |
|  | ⋮ |  |
| NTH CLIENT | f123 | dddppp |

(a)

| ACCOUNT | PASSWORD |
|---|---|
| A123 | aabb |
| Q0000 | 12sss |
| B123 | ccff |
| f123 | dddppp |

(b)

NETWORK SYSTEM, NETWORK MONITOR AND METHOD FOR RESETTING NETWORK MONITOR

CROSS-REFERENCE TO RELATED APPLICATIONS

The present application claims the benefits of priority under 35 U.S.C. 119 and 35 U.S.C. 365 to Korean Patent Application No. 10-2009-0035091 (filed on 22 Apr., 2009), which is herein incorporated by reference in its entirety.

FIELD

The present disclosure relates to a sever computer for performing operating system (OS) and application operations via a network, a network monitor including a client, and a method for resetting the network monitor.

BACKGROUND

Typically, when a specific program is performed in a computer, data related to the specific program to be performed should be stored in a computer and a hard disk (i.e., an auxiliary memory of the computer). Additionally, a user needs to perform a series of operations for executing the stored data.

Additionally, when a plurality of computers are connected via a Local Area Network (LAN) and other networks, data related to programs to be performed in each computer need to be provided. Therefore, according to the programs to be performed in each computer, an auxiliary memory in each computer of the network should have the same data.

FIG. 1 is a view illustrating a configuration of a conventional art network system. The configuration of the conventional art network system includes a server computer 10 and a plurality of client computers 50, 60, 70, and 80.

The server computer 10 includes a computer main body 15, a display device 20, and an input device 25. Each of the client computers 50, 60, 70, and 80 include a computer main body 52, a display device 54, and an input device 56 like the server computer 10.

Accordingly, the related art network system has a configuration in which data stored in the server computer 10 are downloaded into a specific client computer in order to operate a program, or all the client computers perform the same operation according to a control of the server computer 10.

Accordingly, the conventional art network system has a simple data sharing configuration in which data stored in the server computer are simply used in a plurality of client computers.

SUMMARY

In one aspect, a network system includes: a server computer connected to a plurality of client devices and transmitting a processed result to the client device, the processed result being based on an operation signal inputted from at least one of the client devices; and at least one client device connected to the server computer, transmitting an operation signal inputted from a user, and receiving and outputting a processed result signal based on the transmitted operation signal from the server computer, wherein the client device confirms a state of a second signal according to whether a first signal from the server computer is normal or not and selectively performs a reset operation based on a state of the confirmed state of the second signal.

The server computer may include: a memory unit storing an operating system (OS), an application, and account information, the account information corresponding to at least one of the clients; a connection port receiving an operation signal from at least one of the clients and transmitting a processed result about the operation signal to a corresponding client device; and a controller controlling to perform an operation corresponding to an operation signal received from at least one of clients connected to the connection port, and transmitting result data according to the performed operation to a corresponding client device.

At least one of the clients may include: a communication unit connected to the server computer to perform communication; a switching unit outputting selectively a signal received through the communication unit; and a reset unit performing a reset operation selectively according a reception state of a first signal and a second signal received through the communication unit.

The first signal may be a driving power transmitted from the server computer; and the second signal may be a processed result signal corresponding to the transmitted operation signal.

The reset unit instantly may cut off a driving power supplied from the server computer when the first signal is received normally and the second signal is below a predetermined level.

In another aspect, network monitor connected to a server computer through a Local Area Network (LAN) cable may include: a communication unit transmitting an operation signal inputted from a user into the server computer, and receiving a first signal and a second signal transmitted from the server computer; a power switching unit outputting selectively the first signal received through the communication unit; and a reset unit checking a reception state of the second signal according to a state of the first signal received through the communication unit, and outputting a reset signal to selectively cut off the first signal based on a reception state of the checked second signal.

The first signal may be a driving power transmitted from the server computer; and the second signal may be a processed result signal processed in the server computer according to the transmitted operation signal.

The power switching unit periodically may transmit state information of the first signal received through the communication unit.

The network monitor may include: a signal switching unit operating based on the first signal supplied from the server computer and separating the received second signal for output, wherein the second signal is a sync signal multiplexed with a plurality of signals.

The reset unit may output a reset signal when the first signal is received normally and the second signal is received below a reference level.

The power switching unit may cut off the first signal supplied to the signal switching unit according to the reset signal and resets the signal switching unit.

The reset signal and state information of the first signal may be transmitted through the same line.

In yet another aspect, a method for resetting a network monitor that is connected to a server computer to perform communication with the server computer may include: receiving a first signal transmitted from the server computer; confirming a state of a second signal transmitted from the server computer according to whether the first signal is normally received or not; and performing a reset operation selectively according to the confirmed state of the second signal.

The first signal may be a driving power transmitted from the server computer; and the second signal may be a processed result signal processed in the server computer according to the transmitted operation signal.

The performing of the reset operation may include cutting off an output of the first signal supplied from the server computer when the first signal is received normally and the second signal is received below a reference level.

BRIEF DESCRIPTION OF THE DRAWINGS

FIG. 7 is a view illustrating a storage stage of a network system.

DETAILED DESCRIPTION

Hereinafter, a network system, a network monitor, and a method for resetting the network monitor are described with reference to the accompanying drawings.

First, the terms used in the present disclosure are referring to extensively used general terms, if possible. But, in a specific case, the terms that the applicant arbitrarily selects may be used. Operations and meanings of these applicant selected terms are described in detail in the detailed description of the embodiment. Therefore, the present disclosure should be understood in aspects of the operations/meanings that the terms have, instead of the simple naming of the terms.

Figure 1:
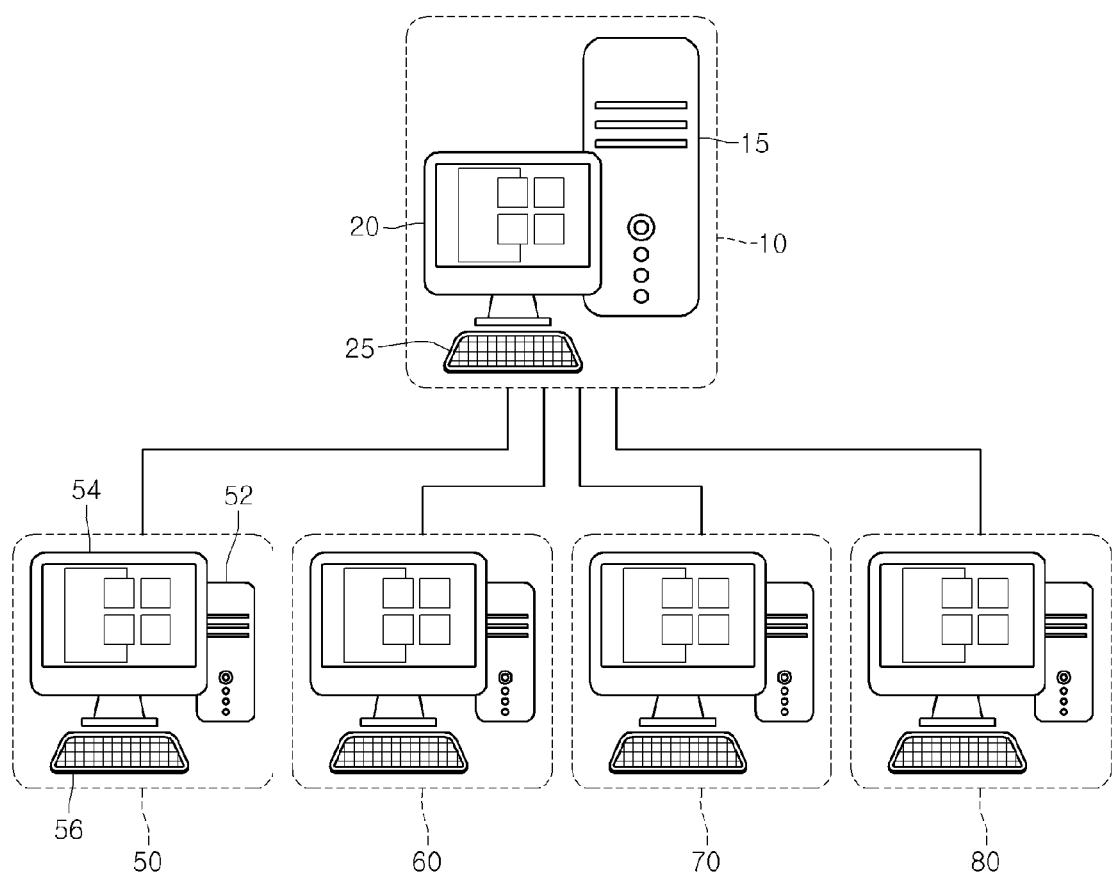
FIG. 1 is a view illustrating a configuration of a conventional art network system.
Figure 2:
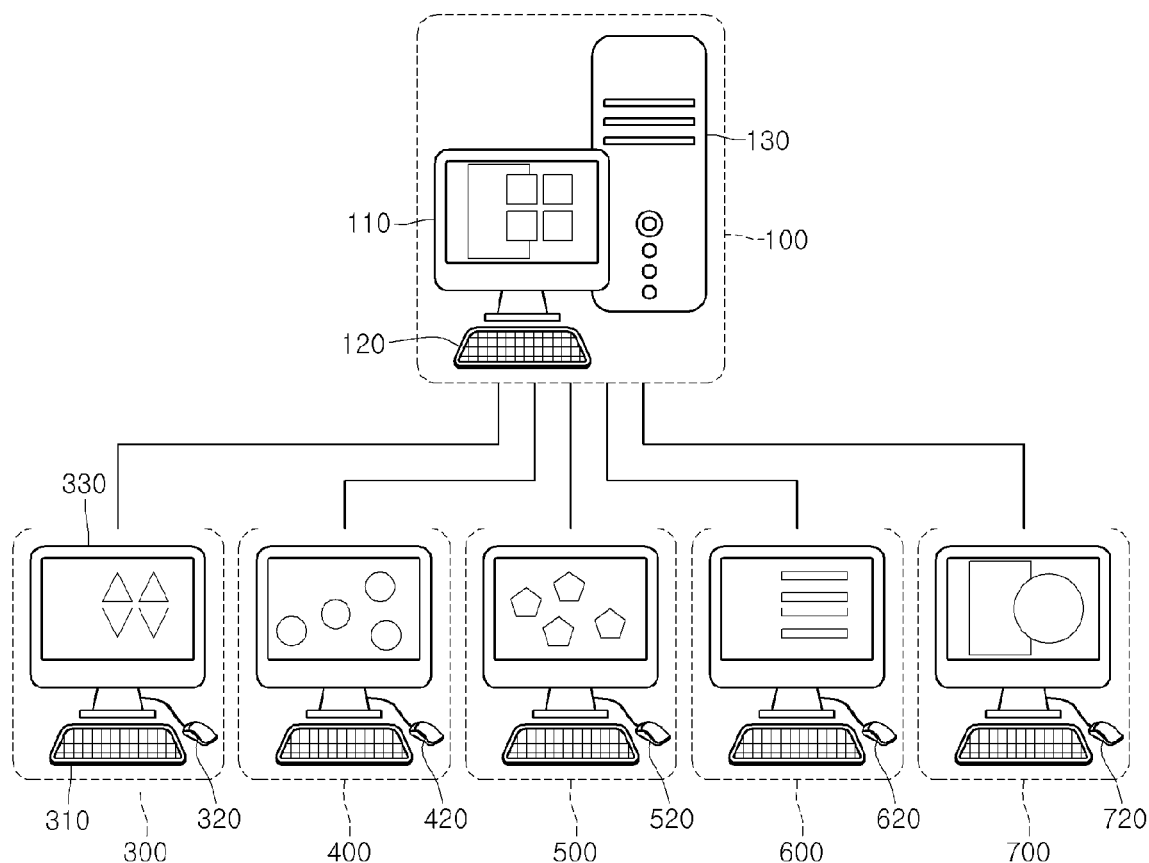
FIG. 2 is a connection configuration view of a network system.

Referring to FIG. 2, a network system includes a server computer 100 and a plurality of client devices 300, 400, 500, 600, and 700 connected to the server computer 100 via a network.

The server computer 100 may include a computer main body 105, a monitor 110 for displaying an image, and a keyboard or a mouse for inputting an operation signal from a user.

The plurality of clients 300, 400, 500, 600, and 700 are connected to the server computer 100, and are configured with an image display device 330 for displaying an image and a user input unit 320 including a keyboard or a mouse for inputting an operation signal from a user.

Figure 3:
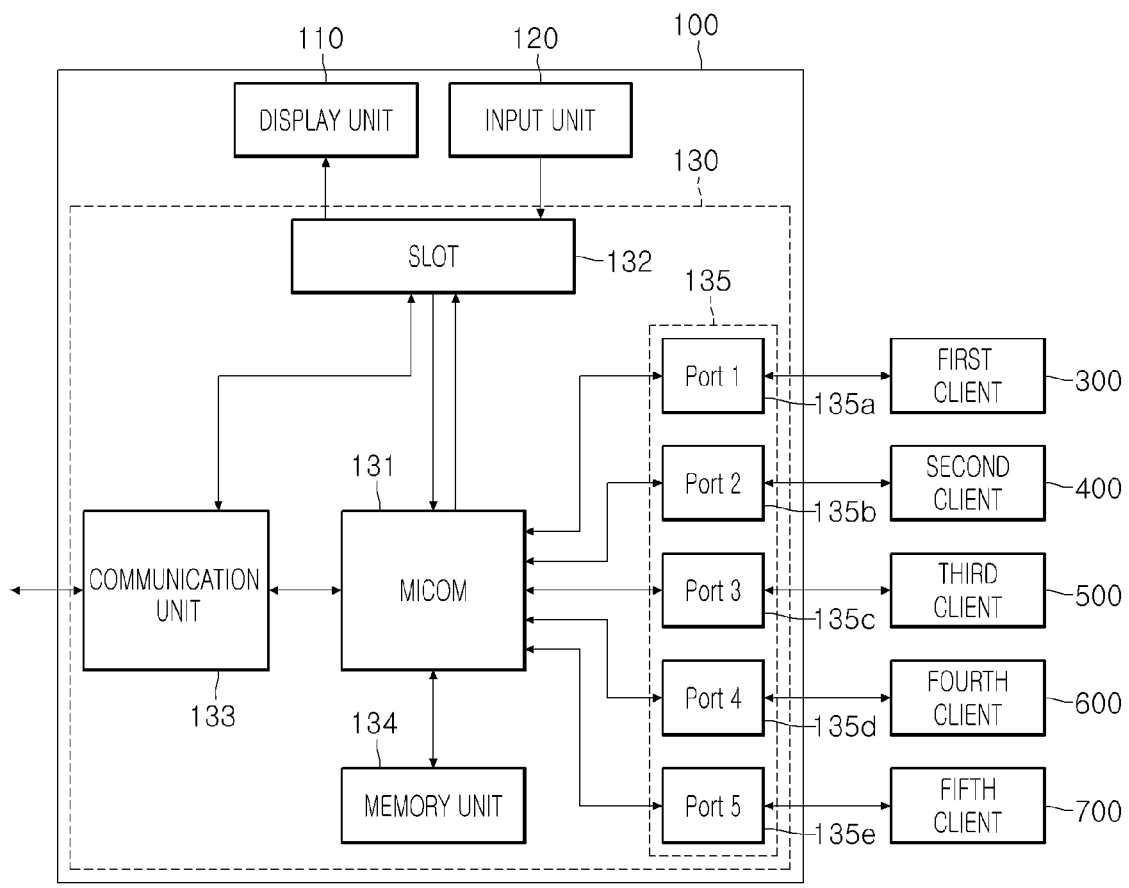
FIG. 3 is a configuration view of a server computer.

As shown in FIG. 3, the server computer 100 includes a plurality of connection ports 135 for allowing a plurality of client devices to be connected to the server computer 100 via a network. Additionally, the server computer 100 includes a memory unit 134 for storing information about the plurality of client devices connected through the connection ports 135, various application data, and an operating system (OS).

As shown in tables (a) and (b) of FIG. 7, the memory unit 134 stores at least one account information inputted through the plurality of clients. Here, the account information may be stored in the memory unit 134 by matching with client information transmitted from each client device. Additionally, only pre-registered account information can be stored in the memory unit 134 regardless of each client information. Moreover, the account information may be inputted through the client device or may be directly configured by a user using an input device of the server computer 100.

The server computer 100 includes a display unit 110 equipped with a monitor and an input unit 120 including a keyboard or a mouse. The display unit 110 and the input unit 120 are connected to the server computer main body 130 through a slot 132. Moreover, the input unit 120 transmits a signal state and result data (which are transmitted into and received from the plurality client devices through the slot 132) into the display unit 110. Additionally, the server computer 100 may perform a function that receives a control signal about each client device through the input unit 120 connected to the slot 132.

Additionally, the server computer 100 includes a micom 131 for controlling data and control signals inputted/outputted through the slot 132 and the connection ports 135 of the client device. The micom 131 reads information about the client device and user account information pre-stored in the memory unit 134, and performs a control function for confirming the account information inputted from a client device connected to the connection ports 135 and performing a network connection.

Additionally, the micom 131 controls to perform a corresponding operation in response to an operation request signal inputted from each client device, and controls a function for transmitting data according to the operation performance result to a corresponding client device through the connection port 135. Here, data that will be transmitted to the client device are configured with a format corresponding to the optimal resolution of the client device, and then are transmitted.

A communication unit 133 of the server computer 100 performs a function for communicating with Internet or external connection devices. Also, the communication unit 133 performs an operation for searching a webpage and uploading/downloading data through the communication unit 133, and transmits result data of the performed operation to a corresponding client device through the connection port 135 of the client device when an application operation request is given from the client device according to internet searching.

Figure 4:
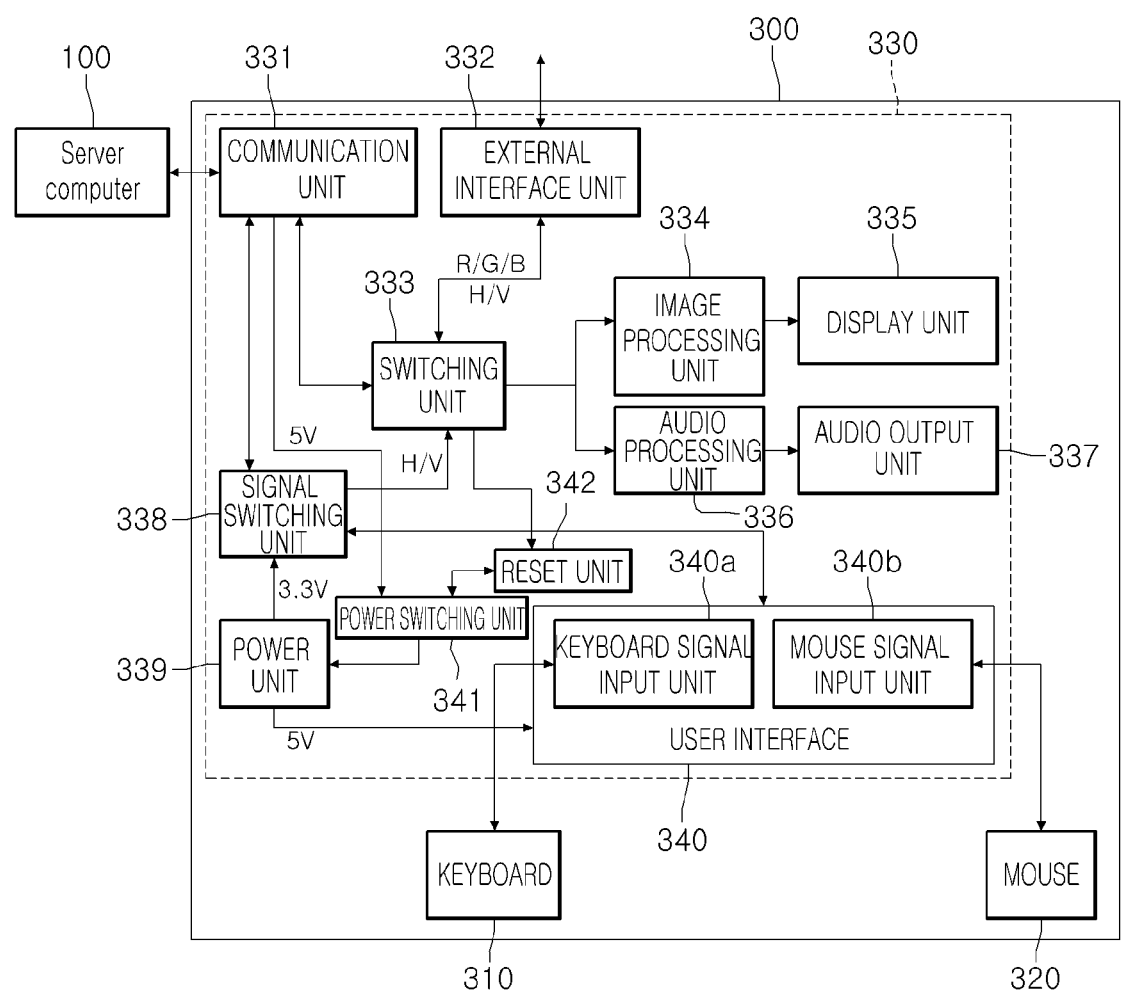
FIG. 4 is a configuration view of a client connected to the server computer via a network.

FIG. 4 is a configuration block of one client device connected to a server computer 100.

The client device 300 includes a communication unit 331 connected to one connection port 135 of the server computer 100. Additionally, the client device 300 transmits a user operation signal inputted from a user interface unit 340 into the server computer 100 through the equipped communication unit 330, or receives result data from the server computer 100 according to the operation signal and outputs them to the display unit 335 or the audio output unit 337.

The communication unit 331 receives a sync signal (into which horizontal/vertical sync signals, an audio signal, and keyboard/mouse signals are multiplexed), RGB data, and a 5 V voltage from the server computer 100. Accordingly, the client device 300 receives result data (corresponding to an operation signal inputted through the user interface unit 340 to which an input device such as a keyboard or a mouse is connected) as the multiplexed sync signal from the server computer 100, and then outputs the result data into the audio processing unit 336 and the image processing unit 334 through the signal switching unit 338. This will be described in more detail below.

Additionally, the client device 300 includes the external interface unit 332. The external interface unit 332 allows the client device 300 to be connected to a second computer main body that can be used as an additional personal computer besides the server computer 100. Accordingly, when the second computer main body is connected through the external interface unit 332, it may operate as a dual monitor operation through an operation of the switching unit 333, or may selectively display one of signals of the server computer 100 inputted through the communication unit 331, or data inputted from the second computer main body.

Figure 5:
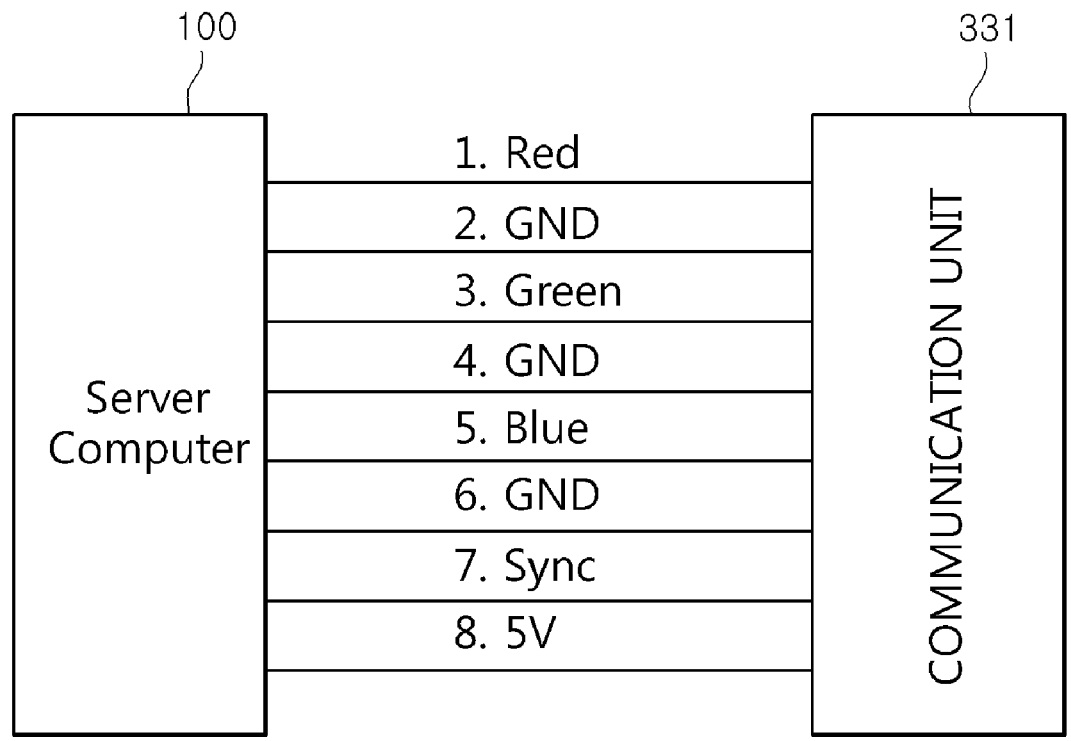
FIG. 5 is a view illustrating a connection line between the server computer 100 and the client 300.

FIG. 5 is a view illustrating a connection line between the server computer 100 and the client 300.

The server computer 100 and the client 300 are connected through a LAN cable including 8 lines.

First, third, and fifth lines among eight lines of the LAN cable are lines used for transmitting Red/Green/Blue data, and the seventh line is a line for transmitting a sync signal, and the eighth line is a line for supplying a 5 V power signal.

Here, the 5 V power signal supplied through the eighth line is transmitted to the signal switching unit 338 and the user interface 340 through a power unit 339. That is, the power unit 339 supplies the 5 V power signal to the user interface 340, and converts the 5 V power signal into a 3.3 V power signal such that it is supplied to the signal switching unit 338.

Additionally, the sync signal inputted through the seventh line of the LAN cable is mixed with a vertical/parallel sync signal, an audio signal, and an input device signal (i.e., keyboard and mouse signals). Accordingly, the signal switching unit 338 separates the mixed sync signal into a vertical/parallel sync signal, an audio signal, and an input device signal, respectively. Additionally, the vertical/parallel sync signal separated through the signal switching unit 338 is transmitted into the switching unit 333, and the audio signal separated through the signal switching unit 338 is transmitted to the audio processing unit 336, and the input device signal separated through the signal switching unit is transmitted into the user interface unit 340.

Additionally, the unmentioned lines (the second, fourth, and sixth lines) among the lines of the LAN cable are ground lines.

As a result, the client device 300 receives signals such as an RGB signal, a sync signal, and a 5 V power signal, which are transmitted through the server computer 100

Figure 6:
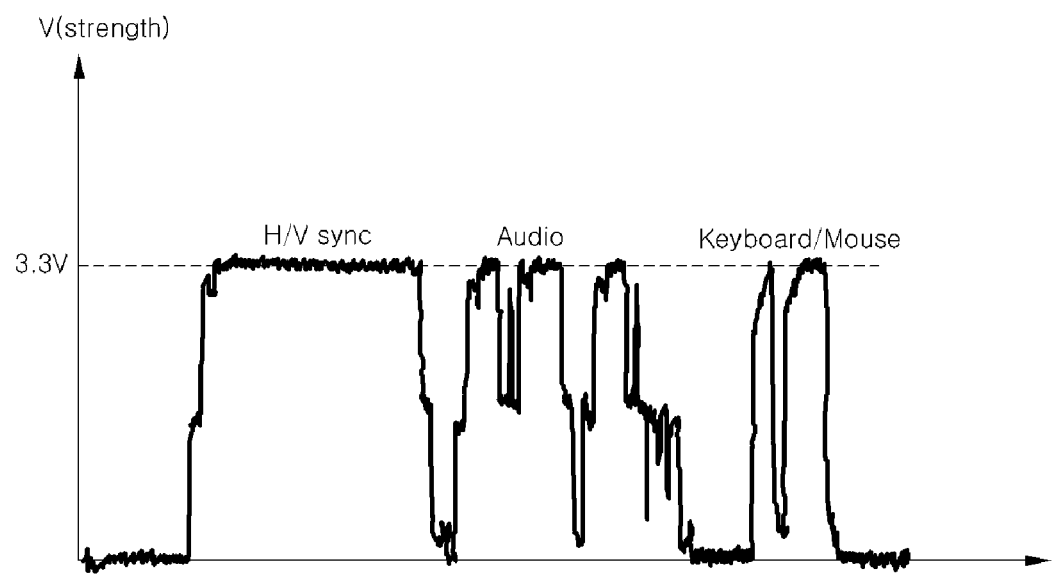
FIG. 6 is a view illustrating a waveform of the sync signal.

FIG. 6 is a view illustrating a waveform of the sync signal.

As shown in FIG. 6, the sync signal is mixed with a vertical/horizontal sync signal (i.e., H/V sync), an audio signal, and an input device signal (i.e., a keyboard/mouse signal).

Accordingly, the signal switching unit 338 separates the inputted mixed sync signal into a vertical/parallel sync signal, an audio signal, and an input device signal, respectively, and the separated signals are transmitted into corresponding components, respectively.

At this point, if a normal sync signal is inputted into the server computer 100, it has a level of 3.3 V. However, if the sync signal is inputted abnormally (due to noise, a had connection state, etc.), a level of the sync signal drops below 3.3 V.

If the level of the sync signal drops below 3.3 V, a level of the vertical/parallel sync signal separated through the signal switching unit 338 becomes close to 0 V, and accordingly, a normal screen may not be displayed through the display unit 335.

The reset unit 342 selectively performs a reset operation by comparing a level of a vertical/parallel sync signal, transmitted to the switching unit 333, with a level of a normal vertical/parallel sync signal.

Here, the reset unit 342 performs the reset operation according to whether a signal transmitted from the server computer 100 is received or not.

That is, because the abnormal level of a sync signal may be inputted according to a connection state between the server computer 100 and the client device 300, the reset unit 342 performs the selective reset operation according to whether a 5 V power transmitted from the server computer 100 is supplied or not.

That is, the reset unit 342 receives a state signal of a 5 V power signal supplied through the server computer 100, from the power switching unit 341. Additionally, the reset unit 342 performs a reset operation when a level of the sync signal drops below 3.3 V power signal under the circumstance where a normal 5 V power signal is supplied.

Here, when the sync signal is received with an abnormal level, it means that the signal switching unit 338 operates abnormally. Therefore, the reset unit 342 instantly cuts off a 5 V power signal supplied to the signal switching unit 338 to reset the signal switching unit 338.

That is, the reset unit 342 transmits a power control signal to the power switching unit 341, such that a 5 V power signal supplied from the server computer 100 can be instantly cut off.

Accordingly, the power switching unit 341 performs a switching operation for instantly cutting off a power supplied to the signal switching unit 338 according to the power control signal of the reset unit 342.

At this point, the power control signal or the state signal of 5 V power is transmitted between the reset unit 342 and the power switching unit 341.

Figure 8:
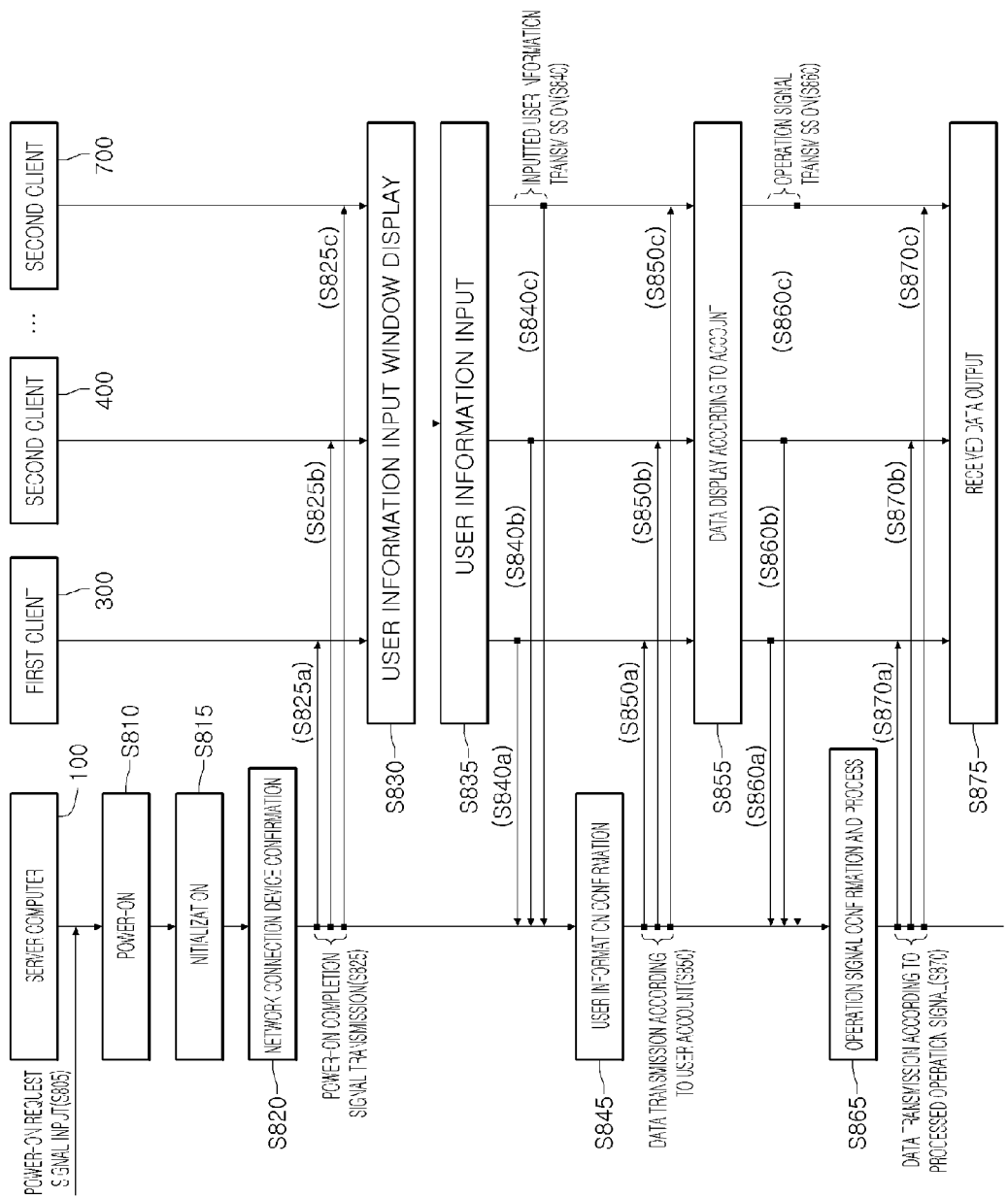
FIG. 8 is a flowchart illustrating an operation method of a network system.

A network system may be configured through a connection of the server computer 100 and the plurality of client devices 300. Accordingly, an operation of the network system will be described in detail with reference to FIG. 8.

When the micom 131 of the server computer 100 receives a power-on signal from a user or detects a power in operation S805, each component including the micom 131 is turned on in operation S810. Next, the micom 131 performs an initialization operation of each component in operation S815 according to a power-on operation and performs a confirmation operation of a network connection state in operation S820.

The confirmation operation of the network connection state is an operation for confirming whether a client device is connected or not and a connection state through the connection port 135 of a client device. The micom 131 of the server computer 100 transmits a power-on completion signal to each client device 300 through the connection port 135 once the confirmation procedure is completed. When the power-on completion signal is transmitted, the server computer 100 generates and transmits log-in window image data to receive log-in information for connection with each client device.

When a power-on completion signal transmitted from the server computer 100 through the communication unit 131, each of the client devices 300, 400, 500, 600, and 700 displays a log-in window screen for receiving log-in information from a user in operation S830. Accordingly, each client device receives user information including an account ID and a password through the user interface unit 340 using the log-in window screen in operation S835. Each client device transmits the user information inputted from the user into the server computer 100 through the communication unit 331 in operation S840.

In operation S845, the server computer 100 receives the user information transmitted from each client device, and compares the user information with the account information of a client device stored in the memory unit 134 or the account information stored regardless of a client device as shown in FIG. 7. In operation S850, the server computer 100 transmits state data of a predetermined initial screen configuration to each client device according to whether the account information transmitted from each client corresponds to the stored account information or not. At this point, if the account information transmitted from each client does not correspond to the stored account information, the server 100 may transmit a message or an audio notifying an error of the transmitted account information, to a corresponding client device.

Each client device, which receives configuration state data according to each account information from the server 100, outputs data such as a corresponding image and a text through the display unit 335 or the audio output unit 337. Later, each client device receives a required operation signal from a user through the user interface unit 340 to which a keyboard or a mouse is connected in operation S855. The inputted operation signal from a user may be a signal for requesting the performance of general computer operations such as a read/write operation of various data stored in the server computer 100, an application executing operation, and a web connecting operation.

Each client device processes an operation request signal inputted from a user to transmit it to the server computer 100 through the signal switching unit 338, and then transmits it to the server computer 100 in operation S860.

The server computer 100 confirms different operation signals received from each client device and processes a request for a corresponding operation in operation S865. Then the server computer 100 generates a processed result using the processed operation signal as data such as an audio, an image, and a text and then transmits them to a corresponding client device in operation S870. Accordingly, each client device outputs data according to an operation signal inputted through the user interface unit 340 to output them through the audio output unit 337 or the display unit 335 in operation S875.

Additionally, the server computer 100 has a modification control power for connection states of a plurality of client devices, and may configure user restriction conditions such as connection end and restoration and a server access restriction for a connected client.

The control power may be shared with a client device that the server computer 100 designates, or may be transferred to a client device.

Figure 9:
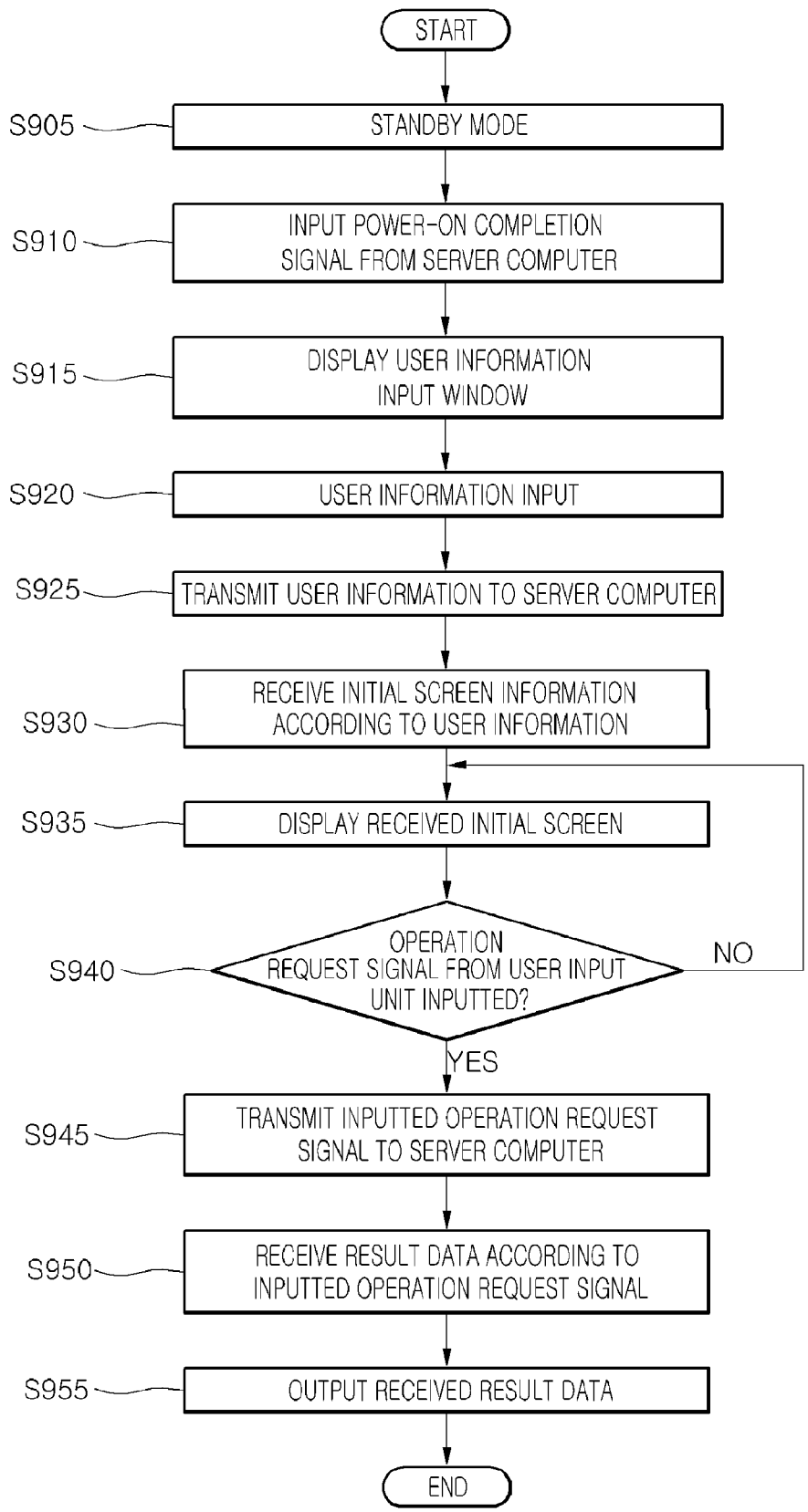
FIG. 9 is a flowchart illustrating an operation method of a client device.

FIG. 9 is a flowchart illustrating an operation of a client device.

The monitor 330 of a client device operates as a standby mode for waiting for an input of an operation drive signal from the server computer 100 with a minimum current flowing into the monitor 330 in operation S905. When a signal for notifying an operation mode is inputted from the server computer 100 after a power is applied to the server computer 100 during the standby mode in operation S910, the monitor 330 displays a window for a user information input in operation S915. Additionally, the client device 300 receives an ID or a password pre-stored in the server computer 100 through a keyboard 310 or a mouse 320 connected to the user interface unit 340 in operation S920, and transmits corresponding information to the server computer 100 in operation S925.

The monitor 330 of a client device receives predetermined data corresponding to user information from the server computer 100 based on user information transmitted through the communication unit 331 in operation S930. The predetermined data may include an initial screen to be displayed on the monitor 330 according to the user information or stored data information. Accordingly, the server computer 100 outputs corresponding images or audios according to the initial screen data received from the server computer 100 in operation S935, and waits for an input of an operation signal of a user.

The monitor 330 of a client, once a predetermined operate request signal is inputted from a keyboard 310 or a mouse 320 connected to the user interface 340 during a standby mode in operation S940, transmits a corresponding signal to the server computer 100 through the communication unit 331. According to the transmitted operation request signal, the server computer 100 performs a corresponding operation and transmits the performed result data through the communication unit 331. The operation request signal may be an operation signal for various functions such as a predetermined signal for an application operation request or a web browse request, which can be performed in a general computer.

The monitor 330 of a client separates a process signal corresponding to the operation request signal received through the communication unit 331 into image/audio/data signals, and then outputs them through the display unit 335 the an audio output unit 337 in operation S955.

Figure 10:
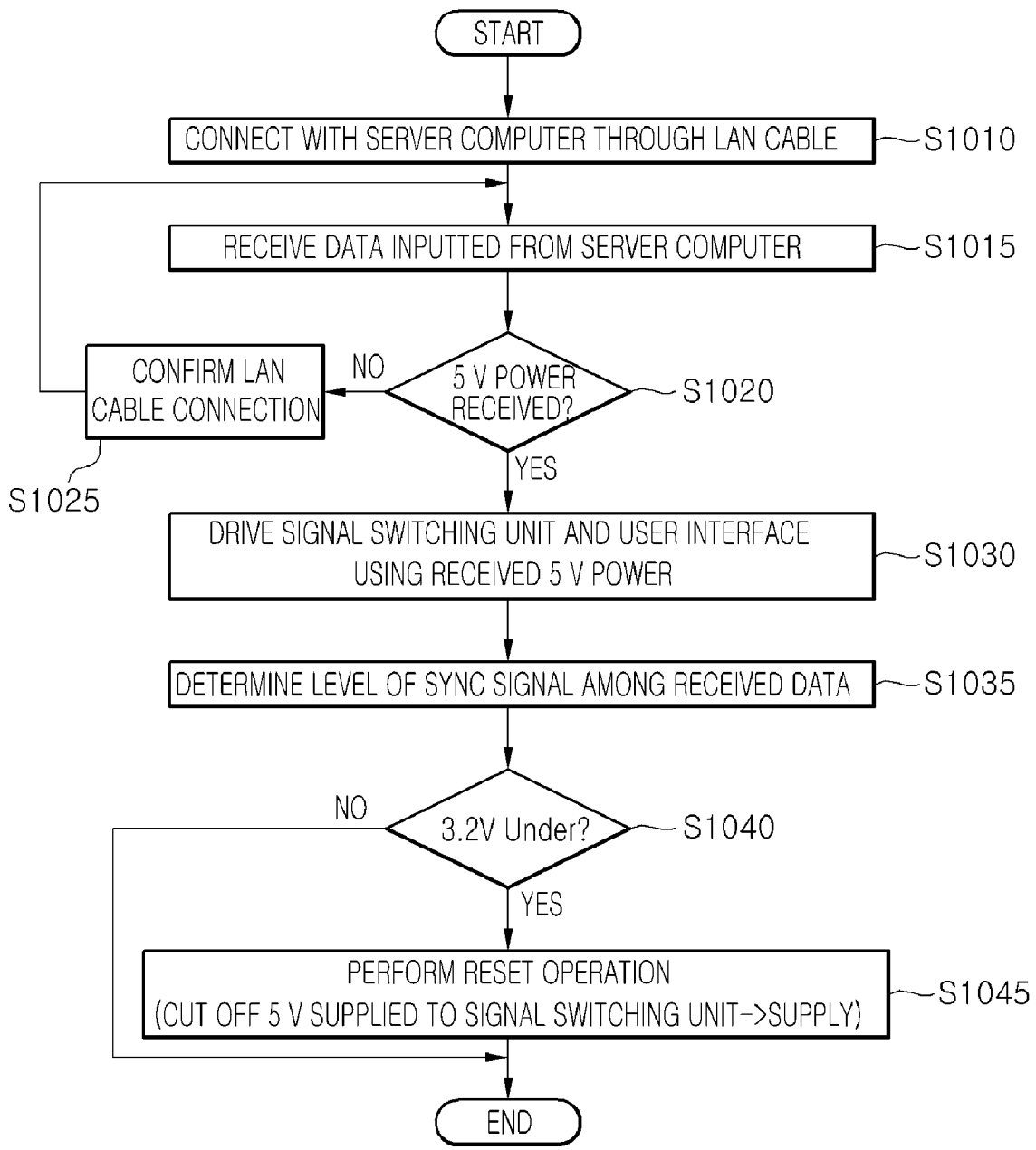
FIG. 10 is a flowchart illustrating a reset method of a network monitor.

Additionally, a reset operation of the network monitor system will be described in detail with reference to FIG. 10.

Referring to FIG. 9, the server computer 100 is connected to a client device first through a LAN cable in operation S1010. That is, a connection port of a client device equipped in the server computer 100 is connected to a communication unit equipped in a client device through the LAN cable.

The client device receives a signal inputted from the server computer through the LAN cable in operation S1015. That is, the client device receives an RGB data signal, a 5 V power signal, and a sync signal through the LAN cable.

The reset unit 342 of the client device determines whether a 5 V power signal is normally supplied from the server computer 100 in operation S1020. That is, the power switching unit 341 transmits a 5 V power signal supplied from the server computer 100 into the reset unit 342. The reset unit 342 determines whether the 5 V power is normally supplied or not based on a state signal supplied from the power switching unit 341.

If the 5 V power signal is abnormally supplied through the server computer 100, a connection state of the LAN cable connecting the server computer 100 and the client device is confirmed in operation S1025.

If the 5 V power signal is normally supplied through the server computer 100, it drives the signal switching unit 338 and the user interface unit 340 based on the supplied 5 V power in operation S1030.

The reset unit 342 determines a level of a sync signal transmitted from the server computer 100 in operation S1035 and then compares a level of the determined sync signal with a normal level. That is, the reset unit 342 determines whether the sync signal level is below 3.3 V or not in operation S1040.

Additionally, when the sync signal level is below 3.3 V, the reset unit 342 transmits a power control signal to the power switching unit 341 to allow a reset operation in operation S1045. That is, the power switching unit 341 instantly cuts off a 5 V power supplied to the signal switching unit 338 according to the power control signal transmitted through the reset unit 342, and resets the signal switching unit 338

The above-mentioned present disclosure allows resources of a server computer to be shared with a plurality of client devices via a network, and can easily configure and operate a network system without an additional device.

Additionally, according to a data transmission state between a server computer and a client, the present disclosure resets the client to prevent a situation where an operation result according to a user instruction is not displayed, before anything happens.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A network system comprising:
a server computer connected to at least one client device and configured to perform at least one operation corresponding to an operation signal received from the at least one client device, and transmitting result data based on the performed operation to a corresponding client device; and
the at least one client device configured to transmit the operation signal to the server computer in response to an input from a user, receive the result data transmitted from the server computer and process the result data,
wherein the at least one of the client devices is configured to determine whether the result data from the server computer is normal and perform power halting operation for a predetermined time period based on a determination that the result data is abnormal.

2. The network system of claim 1, wherein the server computer comprises:
a memory unit storing an operating system (OS), an application, and account information, the account information corresponding to the at least one of the clients;
a connection port receiving an operation signal from the at least one of the clients and transmitting a processed result about the operation signal to a corresponding client device; and
a controller controlling to perform an operation corresponding to the operation signal received from at least one of clients connected to the connection port, and transmitting the result data according to the performed operation to a corresponding client device.

3. The network system of claim 1, wherein the at least one the client comprises:
a communication unit connected to the server computer to perform communication; and
a reset unit configured to perform a reset operation based on the determination that the result data is abnormal.

4. The network system according to claim 3, wherein the reset unit cuts off instantly power supplied to the at the client device.

5. The network system of claim 1, wherein the server computer further transmits a power-on completion signal to the at least one client device.

6. The network system according to claim 5, wherein the at least one client device comprises:
a detector configured to detect a sync signal of the result data including image data;
a comparator comparing a level of the detected sync signal with the predetermined level; and
a controller determining that the result data is abnormal when the level of detected sync signal is lower than the predetermined level.

7. The network system of claim 1, wherein the at least one of the client devices determines that the result data is abnormal when the result data is below a predetermined level.

8. The network system according to claim 1, wherein the result data includes image data.

9. The network system according to claim 1, wherein the result data includes image, audio and text data.

10. A network monitor connected to a server computer through a network, the network monitor comprising:
a communication unit configured to transmit an operation signal in response to an input from a user into the server computer, and receiving result data corresponding to the operation signal transmitted from the server computer;
a processing unit coupled to the communication unit and configured to process the result data;
a power unit configured to supply power; and
a control unit configured to detect a state of the result data received through the communication unit, and output a control signal to halt power for a predetermined time period based on a determination that the detected data is abnormal.

11. The network monitor of claim 10, wherein the power unit is configured to supply the power when power-on completion signal is transmitted from the server computer.

12. The network monitor of claim 10, wherein the control unit includes a reset unit configured to reset the power supplied from the power unit.

13. The network monitor of claim 12, wherein the reset unit outputs a reset signal when the result data is received below a reference level.

14. The network monitor of claim 10, further comprising:
a switching unit operating based on the control signal outputted from the control unit.

15. The network system according to claim 10, wherein the result data includes image data.

16. The network system according to claim 15, wherein the control unit further comprises:
a detector configured to detect a sync signal of the result data including image data;
a comparator comparing a level of the detected sync signal with a predetermined level; and
a controller determining the result data is abnormal when the level of detected sync signal is lower than the predetermined level.

17. A method for a monitor that is connected to a server computer to perform communication with the server computer, the method comprising:
transmitting user information to the server computer;
receiving initial screen information transmitted from the server computer;
transmitting an operation request signal to the server computer and receiving result data that correspond to the operation request signal;
determining that the result data received in a communication unit is abnormal; and
in response to a determination that the result data is abnormal, performing a reset operation.

18. The method of claim 17, wherein performing the reset operation includes reset power supplied from power a supply unit.

19. The method according to claim 17, wherein the reset operation is performed when the data signal is received below a reference level.

20. The network system according to claim 17, wherein the determining step further comprises:
detecting a sync signal of the result data including image data;
comparing a level of the detected sync signal with a predetermined level; and
determining the result data is abnormal when the level of detected sync signal is lower than the predetermined level.

* * * * *